Patented May 6, 1952

2,595,276

UNITED STATES PATENT OFFICE 2,595,276

POLYVINYL ALCOHOL LUCROSE HEMOSTAT

Milton Lester Lowry, Los Angeles, Calif.

No Drawing. Application March 29, 1948,
Serial No. 17,815

6 Claims. (Cl. 167—58)

This invention relates to a hemostatic agent and refers particularly to material intended for stopping bleeding, which material is absorbable by tissue, is nontoxic and nonirritating to tissue, and which in use will not produce eschar.

The hemostatic agent of the present invention consists essentially of an aqueous solution of polyvinyl alcohol and sucrose, but in its preferred form the hemostatic agent of the present invention also includes urea. A further part of the present invention resides in the discovery that the hemostatic properties of the agent are improved by boiling the agent.

I have discovered that hemostatic agents containing polyvinyl alcohols may be applied topically to tissue without irritation or without producing a toxic effect on the tissue and, moreover, the agents are absorbable by the tissue. Polyvinyl alcohols are produced in various grades; the more satisfactory polyvinyl alcohols, however, are those with a medium or low viscosity, preferably those having a low viscosity. Polyvinyl alcohols are powdered materials, but their viscosity is determined by measuring the viscosity of a 4% by weight solution of the polyvinyl alcohols in water at 20° C. Polyvinyl alcohols of a medium viscosity, so measured by a Hoeppler viscometer, show a viscosity of about 24 centipoises, while those of low viscosity measure about 5 centipoises.

Furthermore, the nearly completely hydrolyzed polyvinyl alcohols are preferred over partially hydrolyzed products. Thus polyvinyl alcohols which were 98.5 to 100% hydrolyzed showed superior results to products which were only 86 to 89% hydrolyzed.

Solutions of polyvinyl alcohols in water by themselves exhibit substantially no hemostatic properties, but it is found that by combining sucrose therewith, the desired hemostatic properties are produced. The hemostatic agent may contain from as little as 2% to as much as 20% of polyvinyl alcohol, and from as little as 1% to about 10% of sucrose. In general, it is found that the preferred compositions contain about twice the weight of polyvinyl as sucrose, and usually less satisfactory agents are derived when the proportion of sucrose is greater than or equal to that of the polyvinyl alcohol.

While in certain cases I have employed as a hemostatic agent an aqueous solution containing, for example, only polyvinyl alcohol and sucrose in the proportions of 10% of polyvinyl alcohol and 5% of sucrose, I find that substantial improvements in the hemostatic properties and the action of the same on the tissue can be effected by the addition of urea. When urea is added to the composition, it may be used in proportions of, for example, ¼ to 10%. Furthermore, the composition of the present invention, either utilizing or omitting urea, is substantially improved by a boiling period.

Neither solutions of sucrose alone or solutions of polyvinyl alcohols alone exhibit substantially hemostatic properties, but the admixture of the same is remarkably efficient for that purpose. The solution may be utilized, for example, for stopping bleeding of gums, hemorrhaging, or for covering burns. For all such purposes substantial improvements in both the hemostatic properties and also its action in not irritating tissue are improved by short boiling of the composition, such as, for example, about ten minutes.

As a preferred example of the invention, I have produced a hemostatic agent by adding to distilled water 10% by weight of polyvinyl alcohol of a viscosity of 5 centipoises, to which is also added 5% by weight of sucrose and 2.5% by weight of urea. The resulting preparation is then boiled for ten minutes. It is also possible to add to the hemostatic agent thus described a germicide of any usually preferred type in small percent proportions, such as, from 100,000 to 200,000 parts by weight.

While the particular example of a hemostatic agent herein described is well adapted to carry out the objects of the invention, various modifications may be made, and this invention is of the scope set forth in the appended claims.

I claim:

1. A hemostatic agent comprising an aqueous solution of polyvinyl alcohol, sucrose and urea, the polyvinyl alcohol having a viscosity not over 24 centipoises, a polyvinyl alcohol being present in amount from 2% to 20%, sucrose in amount from 1% to 10%, and urea in amount from ¼% to 10%.

2. A hemostatic agent comprising an aqueous solution of polyvinyl alcohol, sucrose and urea, the polyvinyl alcohol having a viscosity not over 24 centipoises, a polyvinyl alcohol being present in amount from 2% to 20%, sucrose in amount from 1% to 10%, and urea in amount from ¼% to 10%, the agent being boiled.

3. A hemostatic agent comprising an aqueous solution of polyvinyl alcohol and sucrose, the polyvinyl alcohol being present in an amount from 2 to 20% and the sucrose in an amount from 1 to 10%.

4. A hemostatic agent comprising an aqueous solution of polyvinyl alcohol, sucrose and urea, the polyvinyl alcohol being present in an amount from 2 to 20%, the sucrose in an amount from 1 to 10% and the urea in an amount from ¼ to 10%.

5. A hemostatic agent as in claim 3 in which the polyvinyl alcohols are between 98.5 and 100% hydrolyzed.

6. A hemostatic agent as in claim 3 in which the polyvinyl alcohols employed have viscosities of 5 to 24 centipoises as measured in solutions 4% by weight at 20° centipoises by a Hoeppler viscometer.

MILTON LESTER LOWRY.

REFERENCES CITED

The following references are of record in the file of this patent:

UNITED STATES PATENTS

| Number | Name | Date |
|---|---|---|
| 1,921,124 | Hermann et al. | Aug. 8, 1933 |
| 1,998,544 | Jochum | Apr. 23, 1935 |
| 2,072,302 | Hermann | Mar. 2, 1937 |
| 2,160,503 | Hermann | May 30, 1939 |
| 2,226,075 | Rowe | Dec. 24, 1940 |
| 2,340,311 | Donovan | Feb. 1, 1944 |

FOREIGN PATENTS

| Number | Country | Date |
|---|---|---|
| 356,408 | Great Britain | Sept. 10, 1931 |

OTHER REFERENCES

Skinner et al.: Can. M. A. J., Jan. 1943, vol. 48, pp. 13, 15, 16, 17.

Peterson et al.: J. A. M. A., vol. 125, Aug. 5, 1944, pp. 969–973.

Morani: Merck Report, Jan. 1945, pp. 21–23.

Fieser Organic Chem. Heath & Co., 1944, Boston, p. 916.